(12) United States Patent
Zhou

(10) Patent No.: US 8,615,043 B2
(45) Date of Patent: Dec. 24, 2013

(54) FIXED LENGTH CODING BASED IMAGE DATA COMPRESSION

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 523 days.

(21) Appl. No.: 13/021,405

(22) Filed: Feb. 4, 2011

(65) Prior Publication Data

US 2011/0216834 A1 Sep. 8, 2011

Related U.S. Application Data

(60) Provisional application No. 61/310,464, filed on Mar. 4, 2010.

(51) Int. Cl.
*H04N 7/12* (2006.01)
*H04N 11/02* (2006.01)
*H04N 11/04* (2006.01)

(52) U.S. Cl.
USPC .................. 375/240.24; 375/240.12

(58) Field of Classification Search
None
See application file for complete search history.

(56) References Cited

U.S. PATENT DOCUMENTS

| 7,266,247 | B2 * | 9/2007 | Kim et al. | 382/236 |
| 2009/0161759 | A1 * | 6/2009 | Seo et al. | 375/240.12 |
| 2009/0285479 | A1 * | 11/2009 | Hosaki | 382/166 |
| 2010/0098166 | A1 * | 4/2010 | Budagavi et al. | 375/240.16 |

OTHER PUBLICATIONS

Khan and Jamal, "The Intra Prediction in H.264," Novel Algorithms and Techniques in Telecommunications, Automation and Industrial Electronics, 11-15, 2008.*
Sullivan et al., "The H.264/AVC Advanced Video Coding Standard: Overview and Introduction to the Fidelity Range Extensions," SPIE Conference on Applications of Digital Image Processing XXVII, Special Session on Advances in the New Emerging Standard: H.264/AVC, Paper No. 5558-53, Aug. 2004.*
Lee et al., "Improved Lossless Intra Coding for H.264/MPEG-4 AVC," IEEE Transactions on Image Processing, vol. 15, No. 9, p. 2610, Sep. 2006.*
Ying Chen, et al., "Line-Based Compression for Digital Image Data", U.S. Appl. No. 12/572,408, filed Oct. 2, 2009, pp. 1-61.

* cited by examiner

*Primary Examiner* — William C Vaughn, Jr.
*Assistant Examiner* — Michael J Hess
(74) *Attorney, Agent, or Firm* — Mima Abyad; W. James Brady; Frederick J. Telecky, Jr.

(57) ABSTRACT

A method of compressing an image data block is provided that includes computing a pixel residual for each pixel in the image data block except a non-residual pixel, computing a compression level for the image data block based on a minimum pixel residual value and a maximum pixel residual value of the pixel residuals, encoding a compression flag for the image data block, wherein the compression flag includes an indicator identifying the compression level and a first portion of bits from the non-residual pixel, and generating a compressed block comprising a second portion of bits from the non-residual pixel and the pixel residuals encoded using fixed length coding based on the compression level.

20 Claims, 10 Drawing Sheets

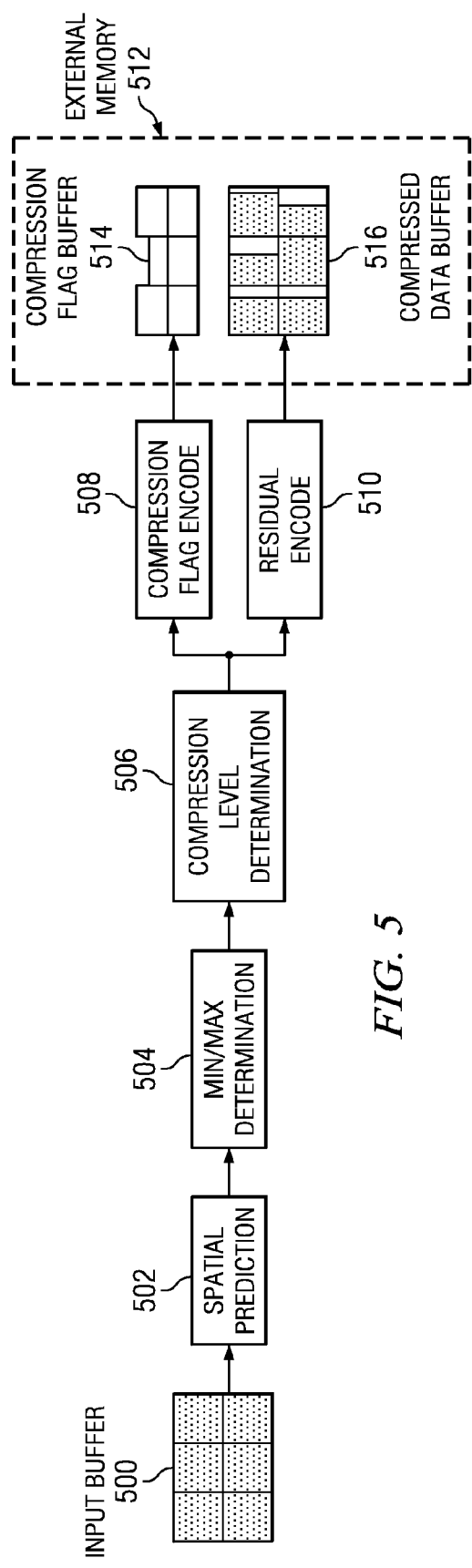
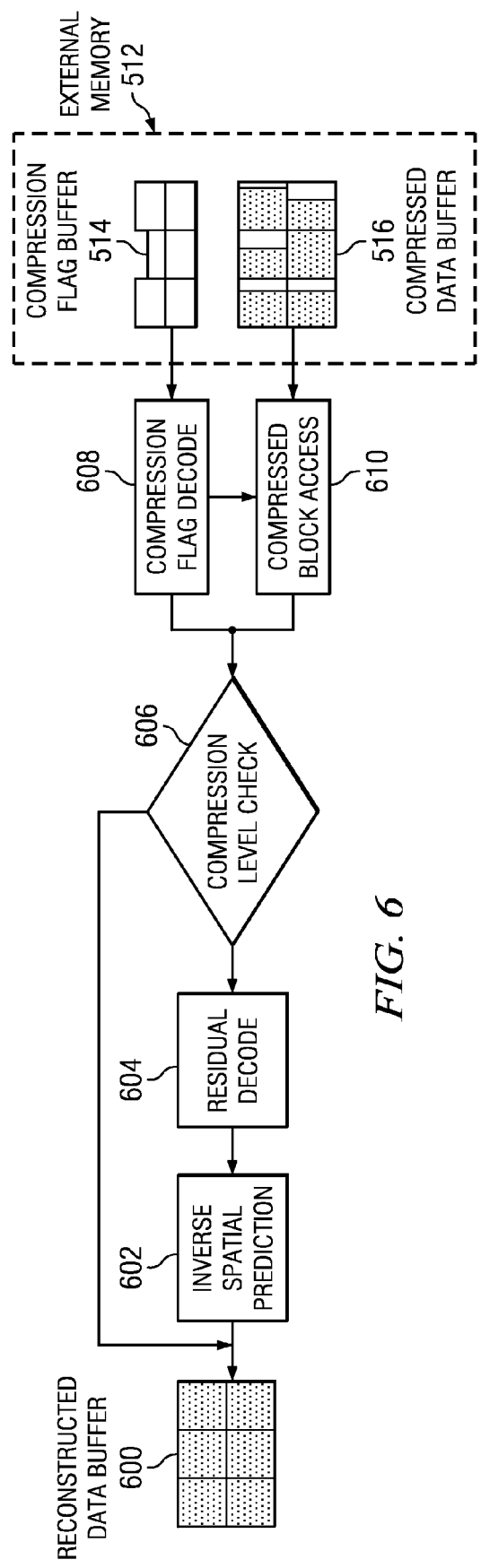
FIG. 5
FIG. 6

US 8,615,043 B2

FIXED LENGTH CODING BASED IMAGE DATA COMPRESSION

CROSS-REFERENCE TO RELATED APPLICATIONS

This application claims benefit of U.S. Provisional Patent Application Ser. No. 61/310,464, filed Mar. 4, 2010, which is incorporated by reference herein in its entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. Codecs may be, for example, industry standards such as MPEG-2, MPEG-4, H.264/AVC, etc. and the standard currently under development, HEVC. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block.

In many digital video products (e.g., a digital still camera, a digital video camera, a cellular telephone, etc.), raw video data is captured by a sensor and fed into a preview engine for processing. After processing, the resulting video sequence is stored in an external (i.e., off-chip) memory. A video encoder then fetches the video sequence from the external memory to encode it. In addition, during encoding, the video encoder both encodes a picture and stores a decoded copy of the picture in the external memory for use in prediction of a subsequent picture. The video encoder then fetches the decoded copy from the external memory when needed to perform prediction. Thus, the video encoder is fetching both pictures to be encoded and prior pictures from external memory to perform the encoding, and storing prior pictures in the external memory.

In a similar fashion, a video decoder both decodes an encoded picture and stores a decoded copy of the picture in external memory for use in decoding of a subsequent encoded picture. The video decoder then fetches the decoded copy from the external memory to perform the decoding. Thus, the video decoder is fetching both pictures to be decoded and prior decoded pictures from external memory to perform the decoding, and storing prior decoded pictures in external memory.

The real-time video data transfer to external memory and to and from external memory to the video encoder or video decoder requires a lot of memory bandwidth, especially if the video resolution is D1 (720×480) or higher. However, memory bandwidth is limited in many digital video products due to both cost and power constraints. Accordingly, reducing memory bandwidth requirements for processing video data is desirable.

BRIEF DESCRIPTION OF THE DRAWINGS

Particular embodiments in accordance with the invention will now be described, by way of example only, and with reference to the accompanying drawings:

FIG. 5 shows a block diagram of an image data compression system in accordance with one or more embodiments of the invention;

FIG. 6 shows a block diagram of an image data decompression system in accordance with one or more embodiments of the invention;

DETAILED DESCRIPTION OF EMBODIMENTS OF THE INVENTION

Figure 1A:
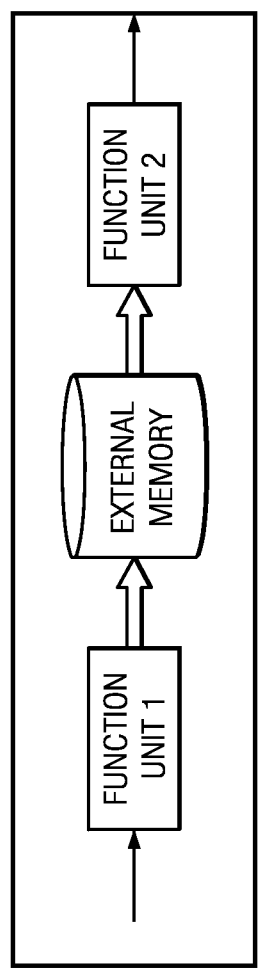
FIG. 1 shows a block diagrams of example systems in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, embodiments of the invention should not be considered limited to any particular video coding standard. In addition, for convenience in describing embodiments of the invention, the term frame may be used to refer to the portion of a video sequence being encoded or decoded. One of ordinary skill in the art will understand embodiments of the invention that operate on subsets of frames such as, for example, a slice, a field, a video object plane, etc.

As used herein, the term digital image data refers to pixels in a single digital image or a digital video sequence. The term may also refer to luminance data and/or chrominance data of pixels. For example, an image data block may be composed of pixels having both luminance data and chrominance data, pixels having only luminance data, or pixels having only chrominance data. The pixels may be all or a subset of a single digital image or may be all or a subset of a frame/picture in a digital video sequence, and may be have one or multiple color components. Accordingly, although various embodiments of the invention are described herein in reference to processing of digital video sequences, embodiments for processing of digital still images will be understood by one of ordinary skill in the art.

Digital image and video capture and playback have become a standard feature in many consumer electronic products such as Digital Still Cameras (DSCs), 3-G cellular phones, Digital Camcorders, PDAs etc. As processors for these products become more powerful, the demand for higher and higher image and video resolution increases. These increases in the resolution increase the memory bandwidth (speed) requirements.

FIG. 1A is a block diagram illustrating an example of memory to memory based signal processing employed in the digital image and video products. Due to large frame sizes and limited on-chip memory, whole images are typically not buffered on-chip. Instead, function units in a codec process images or frames block by block, and use off-chip memory, e.g., synchronous dynamic random access memory (SDRAM), for data exchange between different function units. As shown in FIG. 1A, after the processing of function unit 1, the image data is written into the external memory. The next function unit in the processing chain, e.g., function unit 2, then fetches the data from the external memory for further processing. This memory to memory structure can lead to a large amount of data traffic between the external memory and on-chip memory, thus requiring high memory bandwidth, especially at HD or Ultra-HD resolution.

Figure 1B:
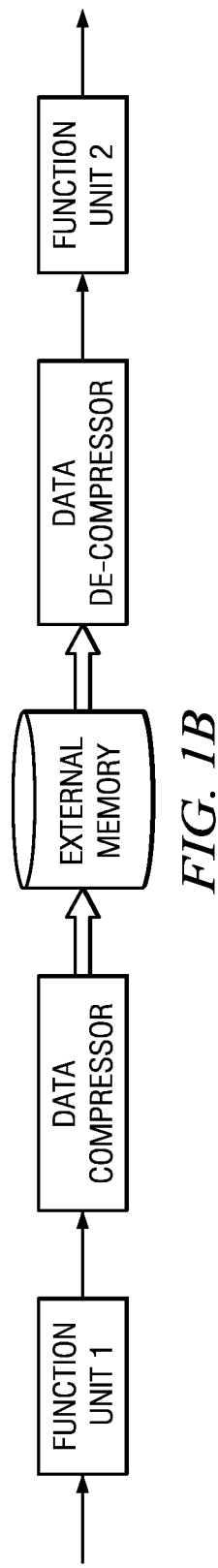

Compression techniques may be used to lower the memory bandwidth requirement and overall system cost. As shown in FIG. 1B, data compression and decompression may be performed between the function units and the external memory to achieve memory bandwidth reduction. In general, the compression and decompression performed needs to be lightweight and efficient, so as to reduce the memory bandwidth requirements without adding significant cost to the system. The reduction in memory bandwidth may also reduce the power consumption associated with reading/writing external memory, thus enabling longer play time for a given battery capacity, or the use of a smaller battery for the same play time. Either of these is desirable in most portable consumer electronic devices.

Variable length coding (VLC) based compression such as that described in U.S. patent application Ser. No. 12/572,408, filed on Oct. 2, 2009, has been proven to be an efficient way of reducing memory bandwidth. However, VLC may not be suitable for some applications as the sequential nature of VLC may negatively affect throughput and latency. In applications requiring high throughput and low latency, it may be desirable to tradeoff compression efficiency for increased throughput and reduced latency.

In general, embodiments of the invention provide for compression and decompression of digital image data to reduce memory bandwidth requirements for image/video encoding and decoding. More specifically, in one or more embodiments of the invention, low-complexity, multi-level fixed length coding (FLC) based compression and decompression of image data is provided. In one or more embodiments of the invention, to compress a frame of image data, the frame is divided into blocks of pixels. These blocks are compressed in raster scan order as follows. Initially, spatial prediction is performed on all pixels in a block except one pixel, for example, the pixel in the upper left corner (ULCP) of the block, to generate a residual block. The one pixel is referred to as the non-residual pixel herein. The minimum and maximum residual pixel values in the block are then determined. These minimum and maximum residual pixel values bound the dynamic range of the residual block.

A compression level for the residual block is then determined based on the dynamic range. If the residual block can be compressed in less than n bits per pixel, where n is the number of bits in a pixel, then each residual pixel in the residual block is compressed using a FLC with a codeword size based on the compression level. A portion of the non-residual pixel is also compressed based on the compression level. The compressed block is stored in a compressed data buffer in external memory. Further, the compression level and the remainder of the non-residual pixel are coded and stored in a compression flag buffer in a location corresponding to the location in the compressed data buffer of the compressed block.

In one or more embodiments of the invention, to decompress a compressed block of image data, the compressed block is retrieved from the compressed data buffer. The compression flag corresponding to the residual block is also retrieved from the compression flag buffer. The compression flag is decoded to determine the compression level used to compress the compressed block. If the compression level indicates that no compression was performed, the compressed block is stored directly in on-chip memory, e.g., in a reconstructed data buffer. If the compression level indicates that compression was performed, then compressed block is decoded in accordance with the compression level to reconstruct the residual block. Inverse spatial prediction is then performed on the residual pixels to reconstruct those pixels. In addition, the non-residual pixel is reconstructed from the portion stored in the residual block and the portion stored in the compression flag. The reconstructed block is then stored in the on-chip memory.

In some embodiments of the invention, raw digital image data is pre-processed and compressed as described herein and stored in an external memory. The compressed data is then decompressed when fetched from memory by an encoder to be encoded. Further, in some embodiments of the invention, reference frame data generated by an encoder during encoding of digital image data is compressed prior to storage in an external memory as described herein. The compressed reference data is then decompressed to reverse the compression as described herein when fetched from the external memory by the encoder for use in encoding. In some embodiments of the invention, reference frame data generated by a decoder during decoding of digital image data is compressed prior to storage in an external memory as described herein. The compressed reference frame data is then decompressed to reverse the compression as described herein when fetched from the external memory by the decoder for use in decoding. Further, the encoded digital image data received by the decoder may be compressed as described herein as it is received and stored in external memory. The compressed data is then decompressed when fetched from memory by the decoder.

Figure 2:
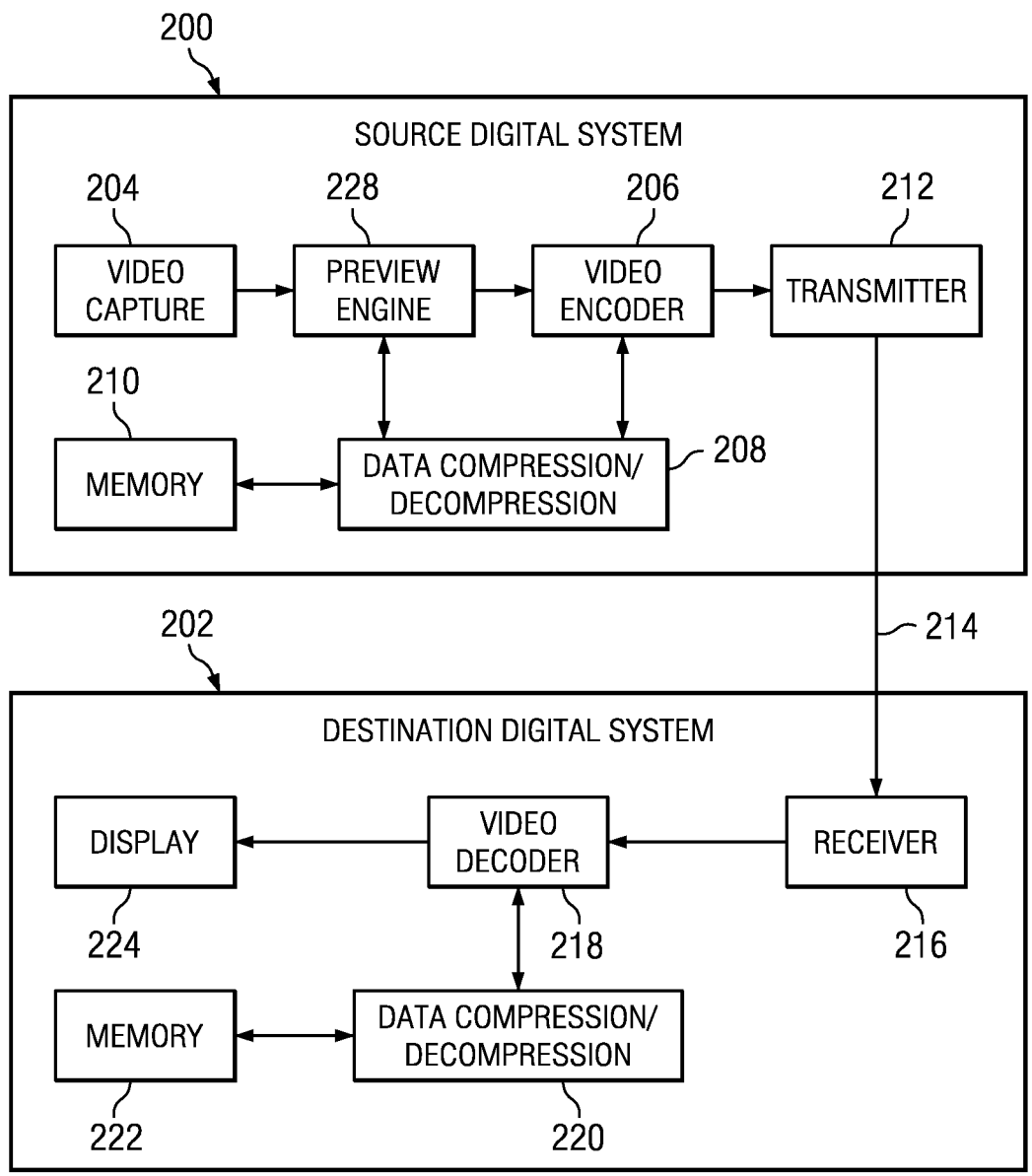
FIG. 2 shows a block diagram of a digital system in accordance with one or more embodiments of the invention.

FIG. 2 shows a block diagram of a digital system in accordance with one or more embodiments of the invention. The digital system is configured to perform compression and decompression of digital image data as described herein. The digital system includes a source digital system (200) that transmits encoded video sequences to a destination digital system (202) via a communication channel (214). The source digital system includes a video capture component (204), a preview engine (228), a data compression/decompression component (208), a memory component (210), and a video encoder component (206), and a transmitter component (212).

The video capture component (204) is configured to provide digital image data to the preview engine (228). The video capture component (204) may include, for example, an image sensor such as a charge-coupled device (CCD) or a complementary metal-oxide-semiconductor (CMOS) sensor that captures analog image information in the form of pixels. The video capture component may include a color separator to separate pixel-sequential image signals into color-separated pixel signals, such as primary red (R), green (G) and blue (B) signals. The analog color-separated pixel signals are converted to digital image signals and provided to the preview engine (228).

The preview engine (228) includes functionality to perform image pre-processing tasks on the digital input signals. The image pre-processing tasks enhance the quality of the input image and convert it into a format for further processing, e.g., Y/Cb/Cr 4:2:2 format. These tasks may include color filter array (CFA) interpolation, color space conversion, gamma correction, another image enhancement tasks such as noise filtering and RGB blending. After the pre-processing, the digital image data is compressed by the data compression/decompression component (208) and stored in the memory component (210). The compression is performed as described herein. The memory component (210) may be any suitable memory technology such as, for example, synchronous dynamic random access memory (SDRAM).

The video encoder component (206) includes functionality to encode captured, pre-processed digital image data. More specifically, the video encoder component (206) retrieves the digital image data from the memory (210) via the data compression/decompression component (208) and encodes it transmission and/or for storage in a storage component (not shown). The data compression/decompression component (208) decompresses the digital image data as described herein. The storage component may be any suitable storage technology, such as, for example, a secure digital card, an internal hard drive, etc.

In general, the video encoder component (206) retrieves the digital image data from the memory (210) as a sequence of video frames, divides the frames into coding units which may be a whole frame or a slice of a frame, divides the coding units into blocks of pixels, and encodes the digital image data in the coding units based on these blocks. During the encoding process, the video encoder component (206) uses reference frame data from previously encoded frames to encode subsequent frames. As is explained in more detail in reference to FIG. 3, the reference frame data is generated after encoding a frame and is stored, via the data compression/decompression component (208), in the memory (210). The data compression/decompression component (208) compresses the reference frame data before it is stored in the memory (210) as described herein. When the reference data is needed, the video encoder component (206) retrieves it from the memory (210) via the data compression/decompression component (208). The data compression/decompression component (208) decompresses the reference data prior to providing it to the video encoder component (206) as described herein. The functionality of one or more embodiments of the video encoder component (206) is described in more detail below in reference to FIG. 3.

The transmitter component (212) transmits the encoded video data to the destination digital system (202) via the communication channel (214). The communication channel (214) may be any communication medium, or combination of communication media suitable for transmission of the encoded video sequence, such as, for example, wired or wireless communication media, a local area network, or a wide area network.

The destination digital system (202) includes a receiver component (216), a video decoder component (218), a data compression/decompression component (220), a memory (222), and a display component (224). The receiver component (216) receives the encoded video data from the source digital system (200) via the communication channel (214) and provides the encoded video data to the video decoder component (218) for decoding.

In general, the video decoder component (218) reverses the encoding process performed by the video encoder component (206) to reconstruct the frames of the video sequence. During the decoding process, the video decoder component (218) uses reference frame data from previously decoded frames to decode subsequent frames. As is explained in more detail in reference to FIG. 4, the reference frame data is generated after decoding a frame and is stored, via the data compression/decompression component (220), in the memory (222). The data compression/decompression component (220) compresses the reference frame data before it is stored in the memory (222) as described herein. When the reference frame data is needed, the video decoder component (2186) retrieves it from the memory (222) via the data compression/decompression component (220). The data compression/decompression component (220) decompresses the reference frame data prior to providing it to the video decoder component (218) as described herein. The functionality of one or more embodiments of the video decoder component (218) is described in more detail below in reference to FIG. 4.

The reconstructed video sequence may then be displayed on the display component (244). The display component (244) may be any suitable display device such as, for example, a plasma display, a liquid crystal display (LCD), a light emitting diode (LED) display, etc.

In some embodiments of the invention, the source digital system (200) may also include a receiver component and a video decoder component and/or the destination digital system (202) may include a transmitter component and a video encoder component for transmission of video sequences both directions for video steaming, video broadcasting, and video telephony. Further, a video encoder component may include a data compression/decompression component while a video decoder component receiving the encoded video sequence does not include a data compression/decompression component and vice versa. Moreover, a video encoder component and a video decoder component receiving a video sequence encoded by the video encoder component may not both perform image data compression/decompression in the same way.

The video encoder component (206) and the video decoder component (218) may perform encoding and decoding in accordance with one or more video compression standards such as, for example, the Moving Picture Experts Group (MPEG) video compression standards, e.g., MPEG-1, MPEG-2, and MPEG-4, the ITU-T video compression standards, e.g., H.263, H.264, and HEVC, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (206), the preview engine (228), the video decoder component (218), and the data compression/decompression components (280, 220) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
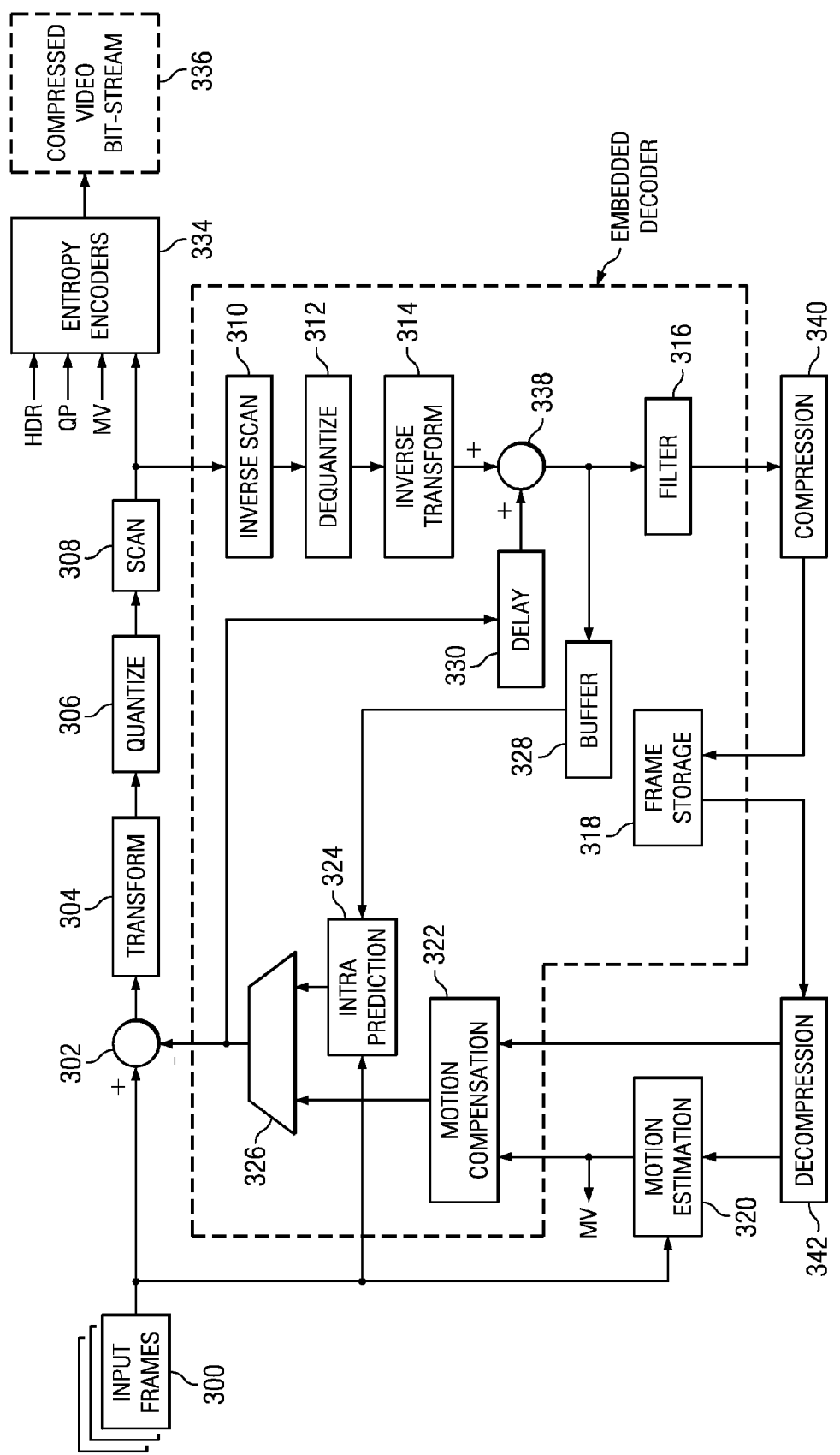
FIG. 3 shows a block diagram of a video encoder in accordance with one or more embodiments of the invention.

FIG. 3 shows a block diagram of a video encoder, e.g., the video encoder (206) of FIG. 2, in accordance with one or more embodiments of the invention. In the video encoder of FIG. 3, input frames (300) for encoding are divided into coding blocks, e.g., macroblocks, and the coding blocks are provided as one input of a motion estimation component (320), as one input of an intra prediction component (324), and to a positive input of a combiner (302) (e.g., adder or subtractor or the like). Further, although not specifically shown, a prediction mode, i.e., inter-prediction or intra-prediction, for each input frame is selected and provided to a mode selector component and the entropy encoders (334). In one or more embodiments of the invention, to reduce memory bandwidth requirements, the input frames (300) may be stored in compressed format in a memory (not shown) and decompressed prior to being provided to the components of the video encoder. The compression and decompression of the input frames (300) is performed as described herein.

The frame storage component (318) stores reference frame generated by the embedded decoder and used by the motion estimation component (320) and the motion compensation component (322). The reference frame data may include one or more previously encoded and decoded frames. In some embodiments of the invention, the frame storage component (318) is external memory, i.e., off-chip memory. In some embodiments of the invention, to reduce memory bandwidth requirements, the reference frame data is compressed by the compression component (340) prior to storage in the frame storage component (318) and is decompressed by the decompression component (342) prior to being provided to the motion estimation component (320) and the motion compensation component (322). The compression component (340) performs compression as described herein and the decompression component (342) performs decompression as described herein.

The motion estimation component (320) provides motion estimation information to the motion compensation component (322) and the entropy encoders (334). More specifically, the motion estimation component (320) performs tests on coding blocks based on multiple temporal prediction modes using reference frame data to choose the best motion vector(s)/prediction mode based on a coding cost. To test the prediction modes, the motion estimation component (320) may divide a coding block into prediction blocks according to the block size of a prediction mode. The motion estimation component (320) provides the selected motion vector (MV) or vectors and the selected prediction mode to the motion compensation component (322) and the selected motion vector (MV) to the entropy encoders (334). The motion compensation component (322) provides motion compensated inter prediction information to a selector switch (326) that includes motion compensated inter prediction blocks and the selected temporal prediction modes. The coding cost of the inter prediction blocks are also provided to the mode selector component.

The intra prediction component (324) provides intra prediction information to the selector switch (326) that includes intra prediction blocks and the corresponding spatial prediction modes. That is, the intra prediction component (324) performs spatial prediction in which tests based on multiple spatial prediction modes are performed on the coding block using previously encoded neighboring blocks of the frame from the buffer (328) to choose the best spatial prediction mode for generating an intra prediction block based on a coding cost. To test the spatial prediction modes, the intra prediction component (324) may divide a coding block into prediction blocks according to the block size of a prediction mode. Although not specifically shown, the coding cost of the intra prediction blocks are also provided to the mode selector component.

The selector switch (326) selects between the motion-compensated interframe prediction blocks from the motion compensation component (322) and the intra prediction blocks from the intra prediction component (324) based on the difference metrics of the blocks and a frame prediction mode provided by the mode selector component. The output of the switch (326) (i.e., the predicted prediction block) is provided to a negative input of the combiner (302) and to a delay component (330). The output of the delay component (330) is provided to another combiner (i.e., an adder) (338). The combiner (302) subtracts the predicted prediction block from the current prediction block of the current coding block to provide a residual prediction block to the transform component (304). The resulting residual prediction block is a set of pixel difference values that quantify differences between pixel values of the original prediction block and the predicted prediction block.

The transform component (304) performs a block transform e.g., a discrete cosine transform (DCT), on the residual prediction blocks to convert the residual pixel values to transform coefficients and outputs the transform coefficients. The transform coefficients are provided to a quantization component (306) which outputs quantized transform coefficients. Because the block transform redistributes the energy of the residual signal into the frequency domain, the quantized transform coefficients are taken out of their raster-scan ordering and arranged by significance, generally beginning with the more significant coefficients followed by the less significant by a scan component (308). The ordered quantized transform coefficients provided via the scan component (308) along with header information are coded by the entropy encoder (334), which provides a compressed bit stream (336) for transmission or storage. The entropy coding performed by the entropy encoder (334) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., the reference frame data, the ordered quantized transform coefficients provided via the scan component (308) are returned to their original post-DCT arrangement by an inverse scan component (310), the output of which is provided to a dequantize component (312), which outputs estimated transformed information, i.e., an estimated or reconstructed version of the transform result from the transform component (304). The estimated transformed information is provided to the inverse transform component (314), which outputs estimated residual information which represents a reconstructed version of the residual prediction block. The reconstructed residual prediction block is provided to the combiner (338).

The combiner (338) adds the delayed selected prediction block to the reconstructed residual prediction block to generate an unfiltered reconstructed prediction block, which becomes part of the reconstructed frame information. The reconstructed frame information is provided via a buffer (328) to the intra prediction component (324) and to a filter component (316). The filter component (316) is an in-loop filter which filters the reconstructed frame information and provides filtered reconstructed coding blocks, i.e., reference frame data, to the frame storage component (318). In some embodiments of the invention, the reconstructed frames are compressed by the compression component (340) as described herein prior to providing them to the frame storage component (318).

Figure 4:
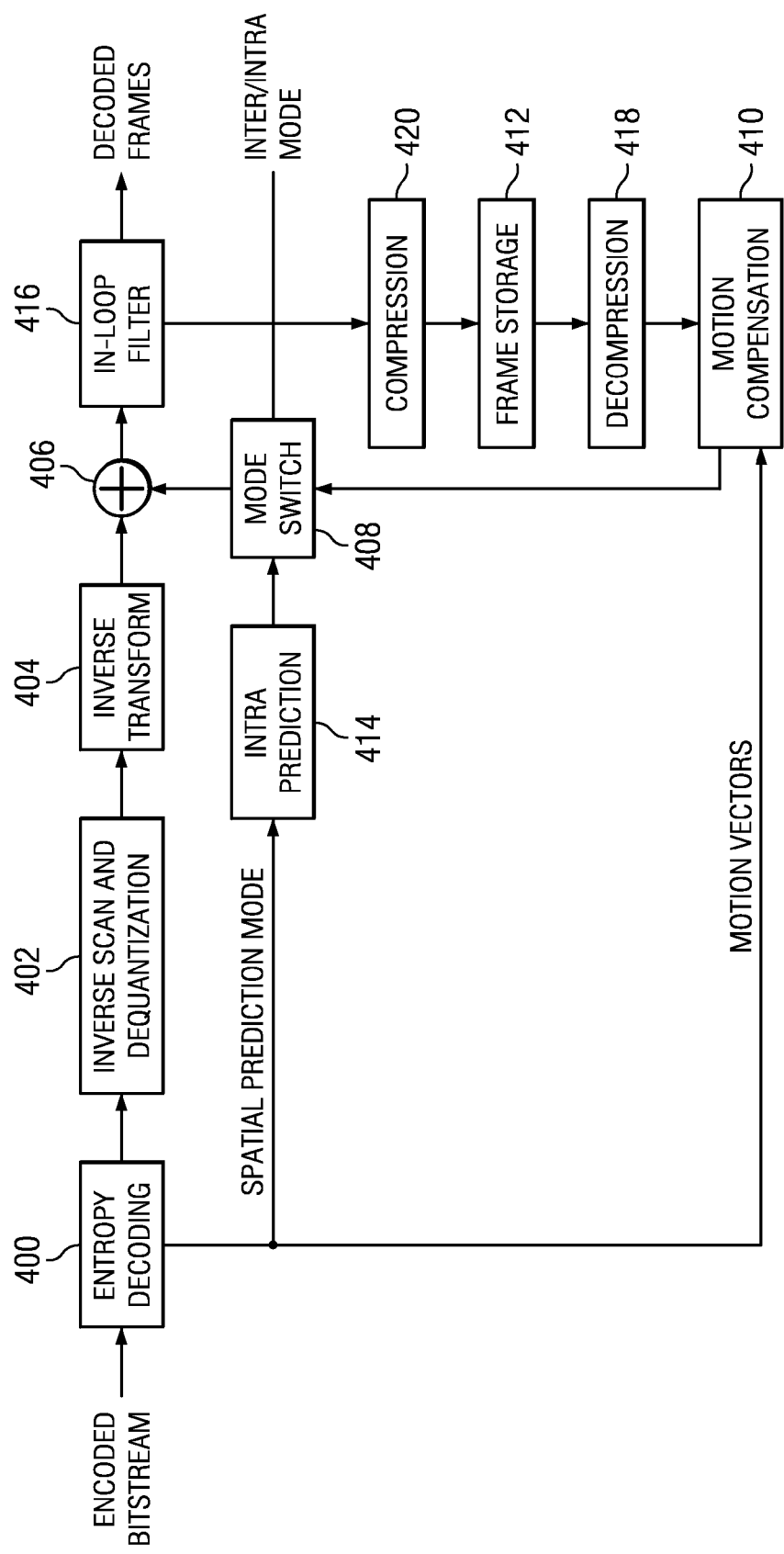
FIG. 4 shows a block diagram of a video decoder in accordance with one or more embodiments of the invention.

FIG. 4 shows a block diagram of a video decoder, e.g., the video decoder (218) of FIG. 2, in accordance with one or more embodiments of the invention. In the video decoder of FIG. 4, the entropy decoding component 400 receives an entropy encoded video bit stream and reverses the entropy encoding to recover the encoded coding blocks. The entropy decoding performed by the entropy decoder component (400) may include functionality to perform one or more of any suitable entropy decoding techniques, such as, for example, context adaptive variable length decoding (CAVLC), context adaptive binary arithmetic decoding (CABAC), run length decoding, etc.

The inverse scan and dequantization component (402) assembles the coding blocks in the video bit stream in raster scan order and substantially recovers the original frequency domain data, de-quantized residual coefficients. The inverse transform component (404) transforms the frequency domain data from the inverse scan and dequantization component (402) back to a residual prediction block. That is, the inverse transform component (404) applies an inverse block transform, i.e., the inverse of the block transform used for encoding, to the de-quantized residual coefficients to produce the residual prediction block.

This residual prediction block supplies one input of the addition component (406). The other input of the addition component (406) comes from the mode switch (408). When inter-prediction mode is signaled in the encoded video stream, the mode switch (408) selects a prediction block from the motion compensation component (410) and when intra-prediction is signaled, the mode switch selects a prediction block from the intra prediction component (414).

The frame storage component (412) stores reference frame data generated by the decoder and used by the motion compensation component (410). The reference frame data may include one or more previously encoded and decoded frames. In some embodiments of the invention, the frame storage component (412) is external memory, i.e., off-chip memory. In some embodiments of the invention, to reduce memory bandwidth requirements, the reference frame data is compressed by the compression component (420) prior to storage in the frame storage component (412) and is decompressed by the decompression component (418) prior to being provided to the motion compensation component (410). The compression component (420) performs compression as described herein and the decompression component (418) performs decompression as described herein.

The motion compensation component (410) receives reference frame data from the frame storage component (412) and applies the motion compensation computed by the encoder and transmitted in the encoded video bit stream to the reference frame data to generate a prediction block. The intra prediction component (414) receives previously decoded prediction blocks from the current frame and applies the intra-prediction computed by the encoder as signaled by a spatial prediction mode transmitted in the encoded video bit stream to the previously decoded prediction blocks to generate a prediction block.

The addition component (406) recovers the predicted prediction block, i.e., generates a decoded prediction block, by adding the selected prediction block and the residual prediction block. The output of the addition component (406) supplies the input of the in-loop filter component (416). The in-loop filter component (416) smoothes artifacts created by the block nature of the encoding process to improve the visual quality of the decoded frame. The output of the in-loop filter component (416) is the decoded frames of the video bit stream. Each decoded prediction block is stored in the frame storage component (412) to be used as reference frame data. Further, reference frame data may be stored for multiple previously encoded frames.

FIG. 5 shows a block diagram of an image data compression system, e.g., a compression component (340) or a compression component (420), in accordance with one or more embodiments of the invention. The image data compression system operates on blocks of image data. That is, a frame to be compressed is evenly divided into rectangular M×N image data blocks (M=1, 2, . . . PicWidth, N=1, 2, . . . , PicHeight, where PciWidth×PicHeight is the frame size). The pixel or sample size n may be any number of bits. Further, the image data blocks to be compressed may be stored in an input buffer (500) in internal, i.e., onchip memory. In some embodiments of the invention, the image data in an image data block includes both the luminance and the chrominance data of the pixels. In some embodiments of the invention, the pixels in an image data block may be split into luminance and chrominance blocks to form two or more image data blocks that are separately compressed. For example, a color image data block may have three components, e.g., Y, U, V. Such a block may be split into Y and UV blocks or separate Y, U, and V blocks.

The image data compression system includes a spatial prediction component (502), a min/max determination component (504), a compression level determination component (506), a compression flag encode component (508), and a residual encode component (510). The spatial prediction component performs spatial prediction on each pixel in an image data block except one pixel, i.e., the non-residual pixel. Any pixel location in an image data block may be designated as the location of the non-residual pixel, but the same location for the non-residual pixel is used for all image data blocks to be compressed. Further, the image data compression system and a corresponding image data decompression system can agree on the location or the location may be communicated from the compression system to the decompression system. The selection of which pixel in an image data block to use as the non-residual pixel is a design choice. In one or more embodiments of the invention, the pixel in the upper left corner (ULCP) of an image data block is the non-residual pixel. Each pixel (except the non-residual pixel) is spatially predicted based on one or more neighboring pixels in the block. The output of the spatial prediction component is a residual block that includes the non-residual pixel and the pixel residuals for the other pixels.

In some embodiments of the invention, the residual of a pixel x, residue (x), is computed as follows:

$$thred(x) = \min\left\{|A - B|, |A - C|, \left|A - \frac{B+C}{2}\right|\right\}$$

$$pred(x) = \begin{cases} C & \text{if } thred(x) = |A - B| \\ B & \text{if } thred(x) = |A - C| \\ \frac{B+C}{2} & \text{if } thred(x) = \left|A - \frac{B+C}{2}\right| \end{cases}$$

$$residue(x) = x - pred(x)$$

where A is the top left neighboring pixel, B is the top neighboring pixel, and C is the left neighboring pixel. If any neighboring pixel is not present (e.g., the first row of pixels in the block will have no top left or top neighboring pixels), the value of that neighboring pixel is set to $2^{n-1}$ where n is the number of bits in a pixel.

The min/max determination component (504) determines the minimum and maximum pixel residual values in a residual block. The minimum pixel residual and the maximum pixel residual may be computed as follows:

minResidual=min(residue(x))

maxResidual=max(residue(x))

The minimum and maximum pixel residual values bound the dynamic range of a residual block.

The compression level determination component (506) selects a compression level for the residual block based on the dynamic range of a residual block. The compression level is represented as bits per pixel (bpp) and for n-bit pixels, the compression ratio is n/bpp. The bpp for a residual block may be computed as per the pseudo code in Table 1.

TABLE 1

1. k = 1
2. if ((minResidual ≥ $-2^{k-1}$ && maxResidual ≤ $2^{k-1}-1$) then bpp = k; exit
3. else k = k+1; go to step 2 if k<n else exit.

In general, if bpp=n, the residual block will not be compressed.

In some embodiments of the invention, n levels of compression are provided. That is, a residual block can be compressed with 1, 2, . . . , n bits per pixel. For example, if n=8, 8 levels of compression are provided. Table 2 shows an example mapping between the bpp and the dynamic range of a residual block for 8-bit pixels and 8 levels of compression.

TABLE 2

| bpp | [minResidual:maxResidual] range |
|---|---|
| 1 | [−1:0] |
| 2 | [−2:1] |
| 3 | [−4:3] |
| 4 | [−8:7] |

TABLE 2-continued

| bpp | [minResidual:maxResidual] range |
|---|---|
| 5 | [−16:15] |
| 6 | [−32:31] |
| 7 | [−64:63] |
| 8 | Otherwise (no compression) |

In some embodiments of the invention, fewer than n levels of compression are provided, i.e., a subset of the n levels of compression is provided. The number of levels of compression in the subset and which of the levels to be included in the subset is a design choice. For example, four levels of compression may be provided rather than eight for 8-bit pixels. In such embodiments, the bpp may be computed as per the pseudo code of Table 1 and any computed value of the bpp that does not correspond to the provided levels of compression may be rounded up to the next available compression level. For example, if 2-bit, 4-bit, 6-bit, and 8-bit compression levels, corresponding respectively to bpp=2, 4, 6, 8, and the computed bpp value is 3, the bpp value is rounded up to the next highest compression level, i.e., 4. Table 3 shows an example mapping between the bpp and the dynamic range of a residual block for 8-bit pixels and 4 levels of compression, 2-bit, 4-bit, 6-bit, and 8-bit.

TABLE 3

| bpp | [minResidual:maxResidual] range |
|---|---|
| 2 | [−2:1] |
| 4 | [−8:7] |
| 6 | [−32:31] |
| 8 | Otherwise (no compression) |

The compression flag encode component (508) encodes a compression flag for a residual block and stores the encoded compression flag in a compression flag buffer (514) in external memory (512). As is explained in more detail below, the compression flag for a block is stored in a position in the compression flag buffer (514) relative to the location of the corresponding compressed block in the compressed data buffer (516). The compression flag includes a sufficient number of bits to encode an indicator of the bpp value computed for the residual block and n-bpp bits of the non-residual pixel. For example, if n compression levels are provided, bpp bits of the compression flag may contain an indicator of the bpp value computed for the residual block and the remaining n-bpp bits contain n-bpp bits of the non-residual pixel. In one or more embodiments of the invention, the least significant bit (LSB) of the bpp bits storing the bpp value indicator is set to one and the most significant bits (MSBs) of the bpp bits are set to zero. In some embodiments of the invention, the least significant bit (LSB) of the bpp bits storing the bpp value indicator is set to zero and the most significant bits (MSBs) of the bpp bits are set to one. Other embodiments of the invention may use other suitable encodings of the bpp value indicators.

In some embodiments of the invention, the bpp value indicator is stored in the bpp MSBs of the compression flag and the bits of the non-residual pixel are stored in the remaining LSBs. In other embodiments, the bpp value indicator and the bits of the non-residual pixel are reversed. Other suitable conventions for storing the bits of the bpp value indicator and the bits of the non-residual may be used, such as, for example, bit-by-bit interleaving. Any n-bpp combination of bits from the non-residual pixel may be stored in the compression flag, as long as the compression system and decompression system agree on the convention. Table 4 shows an example of compression flag encoding when n=8 and 8 levels of compression are provided. In this example, the n-bpp MSBs of the non-residual pixel are stored in the compression flag, while the remaining bpp LSBs of the non-residual pixel are encoded into the compressed block. The eight bits of the non-residual pixel are denoted as b7 b6 b5 b4 b3 b2 b1 b0.

TABLE 4

| bpp | 8-bit compression flag | | | | | | | |
|---|---|---|---|---|---|---|---|---|
| 1 | 1 | b7 | b6 | b5 | b4 | b3 | b2 | b1 |
| 2 | 0 | 1 | b7 | b6 | b5 | b4 | b3 | b2 |
| 3 | 0 | 0 | 1 | b7 | b6 | b5 | b4 | b3 |
| 4 | 0 | 0 | 0 | 1 | b7 | b6 | b5 | b4 |
| 5 | 0 | 0 | 0 | 0 | 1 | b7 | b6 | b5 |
| 6 | 0 | 0 | 0 | 0 | 0 | 1 | b7 | b6 |
| 7 | 0 | 0 | 0 | 0 | 0 | 0 | 1 | b7 |
| 8 | 0 | 0 | 0 | 0 | 0 | 0 | 0 | 1 |

In embodiments of the invention providing less than n levels of compression, the compression flag may be coded differently. For example, if four levels of compression are provided, then two bits of the n-bit compression flag may be used to code a level indicator where 00 indicates the lowest level of compression, 01 represents the next higher level, 10 represents the next higher level, and 11 represents the highest level of compression. The remaining n-2 bits would then store n-2 bits from the non-residual pixel. Alternatively, the same compression flag encoding as for the n levels of compression may be used. For example, if four levels of compression are used for 8-bit pixels such as two-bit, four-bit, 6-bit, and 8-bit compression, the compression flag may be encoded as per the lines of Table 4 for bpp=2, 4, 6, 8, respectively. Note that a 7-bit flag may be used instead of the 8-bit flag in Table 4.

The residual encode component (510) performs fixed length coding (FLC) on the residual block according to the compression level, i.e., bpp, determined for the residual block and also codes the bits of the non-residual pixel not encoded in the compression flag to generate a compressed block that is stored in a compressed data buffer (516) in external memory (512). The FLC and non-residual pixel coding may be performed as illustrated in the pseudo code of Table 5. Note that this pseudo code assumes n levels of compression and that the n-bpp MSBs of the non-residual pixel are encoded in the compression flag. One of ordinary skill in the art will understand embodiments of the residual encoding using other coding conventions for the non-residual pixel and/or fewer levels of compression. As per the pseudo code, if bpp=n, then no compression is performed. Instead, the original image data block is stored in a corresponding block of memory in the compressed data buffer (516). Otherwise, the bpp LSBs of the non-residual pixel are stored in the corresponding block of memory in the compressed data buffer (516) followed by the FLC-coded M*N−1 residual pixels in the residual block. Prior to coding, an offset of $2^{bpp-1}$ is added to each pixel residual to convert it to ensure it is a positive value. Then, bpp bits of the converted pixel residual, i.e., bpp LSBs of the converted pixel residual, are stored in the corresponding block of memory in the compressed data buffer (516).

TABLE 5

```
If (bpp == n) {
    For (x =0; x < M*N; x++)
        put_bits(stream, n, block (x))
```

TABLE 5-continued

```
} else
{
    put_bits(stream, bpp, bpp LSBs of non-residual pixel)
    For (x = 1; x < M*N; x++)
        put_bits(stream, bpp, $2^{bpp-1}$ + residue (x));
}
```

The compressed data buffer (516) may be implemented using any suitable buffer management technique, such as a circular buffer, a sequential list, a linked list, an array, etc. Each entry in the compressed data buffer (516), i.e., each storage block, is a block of consecutive memory locations of sufficient size to store an M×N block of image data. That is, a storage block includes at least a number of memory locations equal to M×N×n divided by the memory location size and rounded up to the next integer. In some embodiments of the invention, the number of memory locations in a storage block is also rounded up to a block size supported by the external memory (512). For example, if the external memory is double-data-rate (DDR) synchronous dynamic random access memory (SDRAM), the number of memory locations in a storage buffer block is rounded up to the nearest multiple of DDR burst sizes. In some embodiments of the invention, a storage buffer block may also include memory locations used for buffer management.

Each output block is stored in a storage block regardless of the size of the output block. This arrangement allows for simple random access to any block stored in the compressed data buffer (516). Further, in one or more embodiments of the invention, the output blocks of the image data compression system are stored in raster scan order in the compressed data buffer (516) such that a block of data stored in the compressed data buffer (516) may be located based on the coordinates of the original image data block in a frame.

The compression flag buffer (514) stores the encoded n-bit compression flags for the block stored in the compressed data buffer (516). The compression flags are stored in the same order in the compression flag buffer (514) as the output blocks in the compressed data buffer (516). In some embodiments of the invention, the compression flags are stored such that a compression flag corresponding to a block of data stored in the compressed data buffer (516) may be located based on the coordinates of the original image data block in a frame.

FIG. 6 shows a block diagram of an image data decompression system, e.g., a decompression component (342) or a decompression component (418), in accordance with one or more embodiments of the invention. The image data decompression system includes a compressed block access component (610), a compression flag decode (608), a compression level check component (608), a residual decode component (604), and an inverse spatial prediction component (502). The output blocks of the image data decompression system are stored in a reconstructed data buffer (600) in onchip memory.

The compression flag decode component (608) retrieves an encoded compression flag from the compression flag buffer (514) corresponding to a block of data in the compressed data buffer (516) that is to be decompressed. The compression flag decode component then decodes the retrieved compression flag to determine the compression level, i.e., bpp, used for the corresponding block and the bits of the non-residual pixel.

The compressed block access component (610) retrieves a data from a storage block in the compressed data buffer (516) based on the compression level determined by the compression flag decode component (610). That is, the compressed block access component reads M×N×bpp bits from a storage block in the compressed data buffer (516) to form a compressed block.

The compression level check component (608) checks the decoded compression level to determine if the data in the retrieved compressed block is actually compressed. If the compression level=n, then the data is not compressed but rather is the original image data block received by the image data compression system. Accordingly, the compression level check component (608) causes the compressed block to be stored in the reconstructed data buffer (600) in a location corresponding to the location of the original image data block in a frame without further processing. Otherwise, the compression level check component (608) causes the compressed block to be further processed to decompress it.

The residual decode component (604) decodes the compressed block according to the compression level to reconstruct the residual block. The decoding performed on the coded pixel residuals essentially reverses the FLC coding performed by the residual encode component (510). The residual decode component (604) also decodes the non-residual pixel by reconstructing it from the non-residual pixel bits stored in the compression flag and the non-residual pixel bits stored in the compressed block. The inverse spatial prediction block (602) essentially reverses the spatial prediction performed by the spatial prediction component (502) to generate reconstructed pixel values from the decoded residual pixel values. The decompressed block is then stored in the reconstructed data buffer (600) in a location corresponding to the location of the original image data block in a frame.

In one or more embodiments of the invention, the output blocks of the image data decompression system are stored in raster scan order in the reconstructed data buffer (600) such that a block of data stored in the reconstructed data buffer (600) may be located based on the coordinates of the original image data block in a frame.

Figure 7:
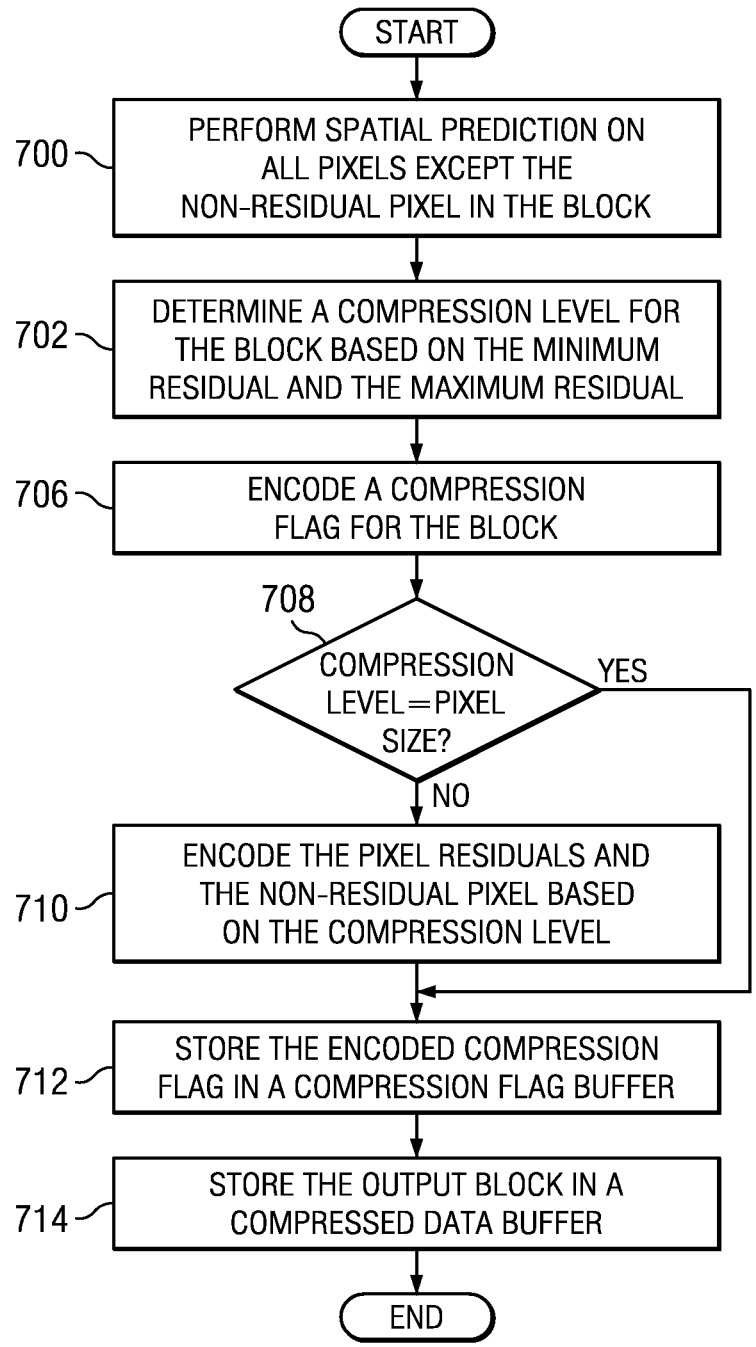
FIG. 7 shows a flow diagram of a method for image data compression in accordance with one or more embodiments of the invention.

FIG. 7 shows a flow diagram of a method for compression of a block of digital image data in accordance with one or more embodiments of the invention. The method is performed in raster scan order on blocks of image data in a frame to compress the frame. That is, a frame to be compressed is evenly divided into rectangular M×N image data blocks (M=1, 2, . . . PicWidth, N=1, 2, . . . , PicHeight, where PicWidth×PicHeight is the frame size). The pixel or sample size n may be any number of bits.

As shown in FIG. 7, initially each pixel in the image data block is spatially predicted except the pixel designated as the non-residual pixel (700). In some embodiments of the invention, the non-residual pixel is the ULCP of the image data block. The spatial prediction may be based on one or more neighboring pixels in the block. In some embodiments of the invention, the spatial prediction uses the top left neighboring pixel, the top neighboring pixel, and the left neighboring pixel as previously described. The result of the spatial prediction of a pixel is subtracted from the pixel to generate a residual pixel. The output of this step may be a residual block formed with the ULCP and the residual pixels.

A compression level (bpp) for the image data block is then determined based on the minimum pixel residual value and the maximum pixel residual value in the residual block and the number of compression levels provided (702). The compression level may be computed as previously described.

A compression flag is then encoded for the image data block (706). The compression flag includes sufficient bits to store an indicator of the compression level and some number of bits from the non-residual pixel. In some embodiments of the invention, the number of bits from the non-residual pixel included in the compression flag depends on the number of bits needed for the compression level indicator. The compression flag encoding may be performed as previously described.

If the compression level is not equal to the pixel size, i.e., the number of bits in a pixel (708), then the residual block is encoded (710) to form an output block of compressed data. Otherwise, the encoding is skipped and the original image data block forms the output block, i.e., the image data is not compressed. In the encoding step (710), the pixel residuals in the residual block and the remaining bits of the non-residual pixel not encoded in the compression flag are encoded according to the compression level (710). The coding of the pixel residuals and the non-residual pixel bits may be performed as previously described.

The encoded compression flag is stored in a compression flag buffer (710) and the output block is stored in a compressed data buffer (714). The compression flag buffer and the compressed data buffer may both be in external, i.e., offchip, memory, or the compression flag buffer may be in internal, i.e., onchip, memory and the compressed data buffer in external memory. These buffers may be implemented as previously described.

Figure 8:
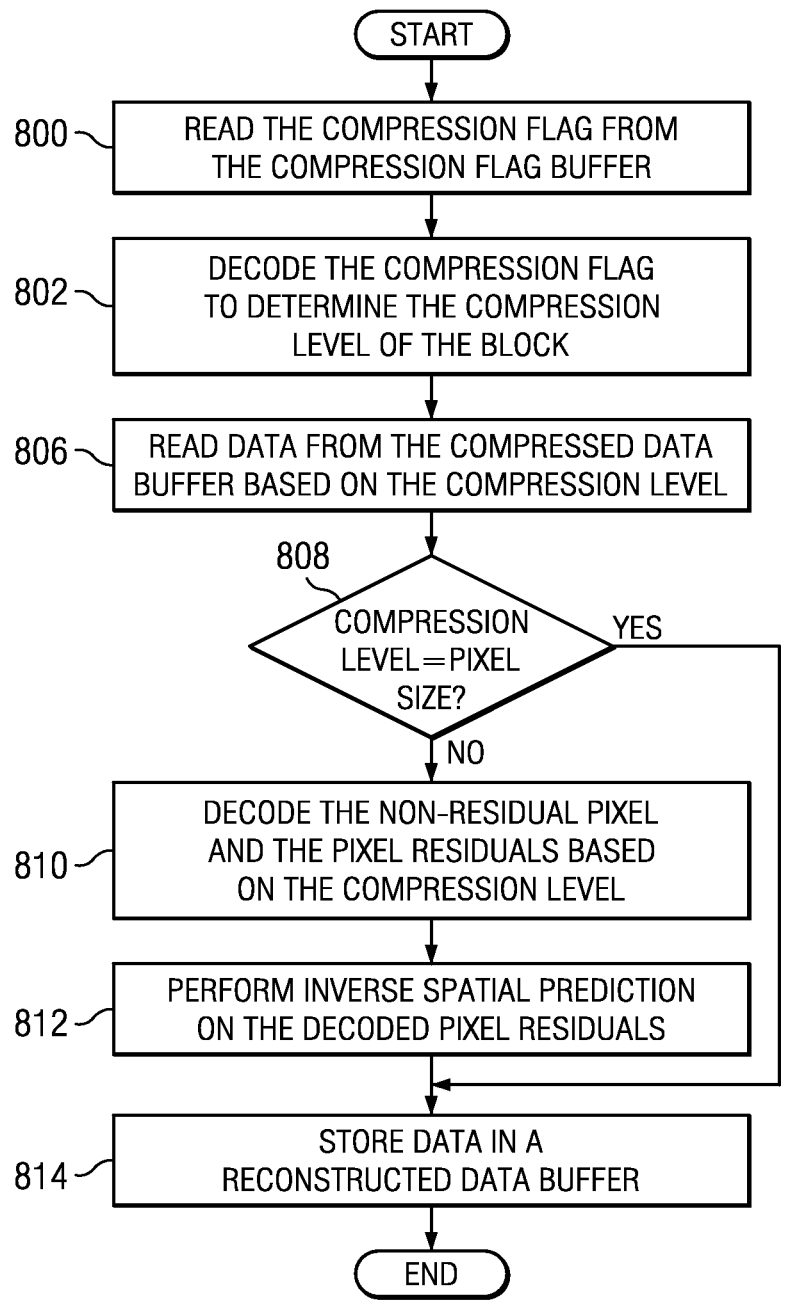
FIG. 8 shows a flow diagram of a method for image data decompression in accordance with one or more embodiments of the invention.

FIG. 8 shows a flow diagram of a method for decompression of an image data block in accordance with one or more embodiments of the invention. The method of FIG. 8 reverses the compression performed by the compression method of FIG. 7. Initially, a compression flag corresponding to the image data block is read from the compression flag buffer (800). The compression flag is then decoded to determine the compression level of the block non-residual pixel stored in the compression flag are also decoded.

Data is then read from the block in the compressed data buffer based on the compression level (806). That is, M×N× bpp bits are read from the block in the compressed data buffer to form a compressed block. If the compression level is equal to the pixel size (808), then the compressed block contains the original image data, i.e., it was not compressed. The compressed block is stored in a reconstructed data buffer with no further processing (814). If the compression level is not equal to the pixel size (808), then the non-residual pixel bits and the pixel residuals in the compressed block are decoded based on the compression level to reconstruct the residual block (810). The decoding may be performed as previously described. Inverse spatial prediction is also performed on the reconstructed pixel residuals to reconstruct those pixels (812). The reconstructed, i.e., decompressed, block is then stored in the reconstructed data buffer (814). The reconstructed data buffer may be implemented as previously described.

Simulations were performed to compare the compression efficiency of two embodiments of the compression method of FIG. 7 with an embodiment of a compression method based on variable length coding (VLC) as described in U.S. patent application Ser. No. 12/572,408. The results of these simulations are shown in Table 5. For all embodiments, n=8 and the image data block size used was 32×4. Further, the Y and UV data in each image data block was compressed separately. For the simulations, eighteen HD (1920×1080) video sequences having sixty frames each were used.

In one embodiment of the method of FIG. 7, labeled 4-level FLC in Table 5, four levels of FLC were provided—2-bit, 4-bit, 6-bit, and 8-bit. In the compression flags, the 2-bit MSB encoded the compression level indicator and the 6-bit LSB stored the six MSBs of the non-residual pixel which is the ULCP. In the other embodiment of the method of FIG. 7, labeled 8-level FLC in Table 5, eight levels of FLC were provided, the non-residual pixel was the ULCP, and the compression flags were encoded as per Table 3. For the VLC-based compression method, labeled VLC in Table 5, a two-bit compression flag was used, the first pixel of an image data block, i.e., the ULCP was coded with 8-bit FLC, and the pixel residuals were coded using VLC.

As the result in Table 5 show, the 8-level FLC was overall about 14% (bpp=3.40 vs. bbp=2.98) less efficient than the VLC-based method. Further, when the number of compression level is reduced from 8 to 4 for 8-bit data as in the 4-level FLC, the efficiency decreases by another 14% on average. However, the decrease in efficiency may be acceptable in applications requiring higher throughput and lower latency that the VLC-based method supports.

TABLE 5

| Sequence | 4-level FLC | | 8-level FLC | | VLC | |
|---|---|---|---|---|---|---|
|  | Y | UV | Y | UV | Y | UV |
| catriverbedvipertrain | 4.57 | 3.41 | 4.09 | 2.94 | 3.95 | 2.28 |
| sbreach | 3.72 | 2.91 | 3.19 | 2.5 | 2.63 | 2.07 |
| sfadevipertraffic | 4.9 | 3.95 | 4.35 | 3.43 | 4.34 | 2.58 |
| sIceHockey | 4.01 | 2.91 | 3.53 | 2.56 | 3.09 | 2.19 |
| smotionvipertraffic | 4.06 | 3.47 | 3.57 | 3.02 | 2.98 | 2.27 |
| sPanIceHockey | 3.39 | 2.56 | 2.98 | 2.22 | 2.58 | 2.07 |
| sriverbed | 5.29 | 3.86 | 4.8 | 3.31 | 4.9 | 2.36 |
| ssunflower | 4.37 | 4.38 | 3.82 | 3.78 | 3.46 | 3.26 |
| stractor | 4.89 | 4.31 | 4.45 | 3.75 | 4.11 | 3.03 |
| svipertrain | 3.83 | 2.93 | 3.38 | 2.56 | 3.01 | 2.19 |
| sviperpouringliquids | 4.54 | 3.42 | 4.17 | 2.94 | 3.56 | 2.17 |
| snoreservations | 4.17 | 2.68 | 3.68 | 2.28 | 3.06 | 2.03 |
| sfountain | 3.91 | 2.79 | 3.34 | 2.34 | 3.43 | 2.17 |
| sjuggle | 4.78 | 3.72 | 4.24 | 3.17 | 3.81 | 2.6 |
| smaninrest | 4.33 | 3.44 | 3.75 | 2.88 | 3.06 | 2.18 |
| svconf9 | 3.94 | 2.82 | 3.35 | 2.33 | 2.98 | 2.05 |
| svconf101 | 3.49 | 2.58 | 2.95 | 2.13 | 2.41 | 2.02 |
| svconf102 | 3.6 | 2.62 | 3.04 | 2.17 | 2.45 | 2.02 |
| Average | 4.21056 | 3.26444 | 3.70444 | 2.795 | 3.32278 | 2.30778 |
| combined bpp |  | 3.89519 |  | 3.4013 |  | 2.98444 |

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 9:
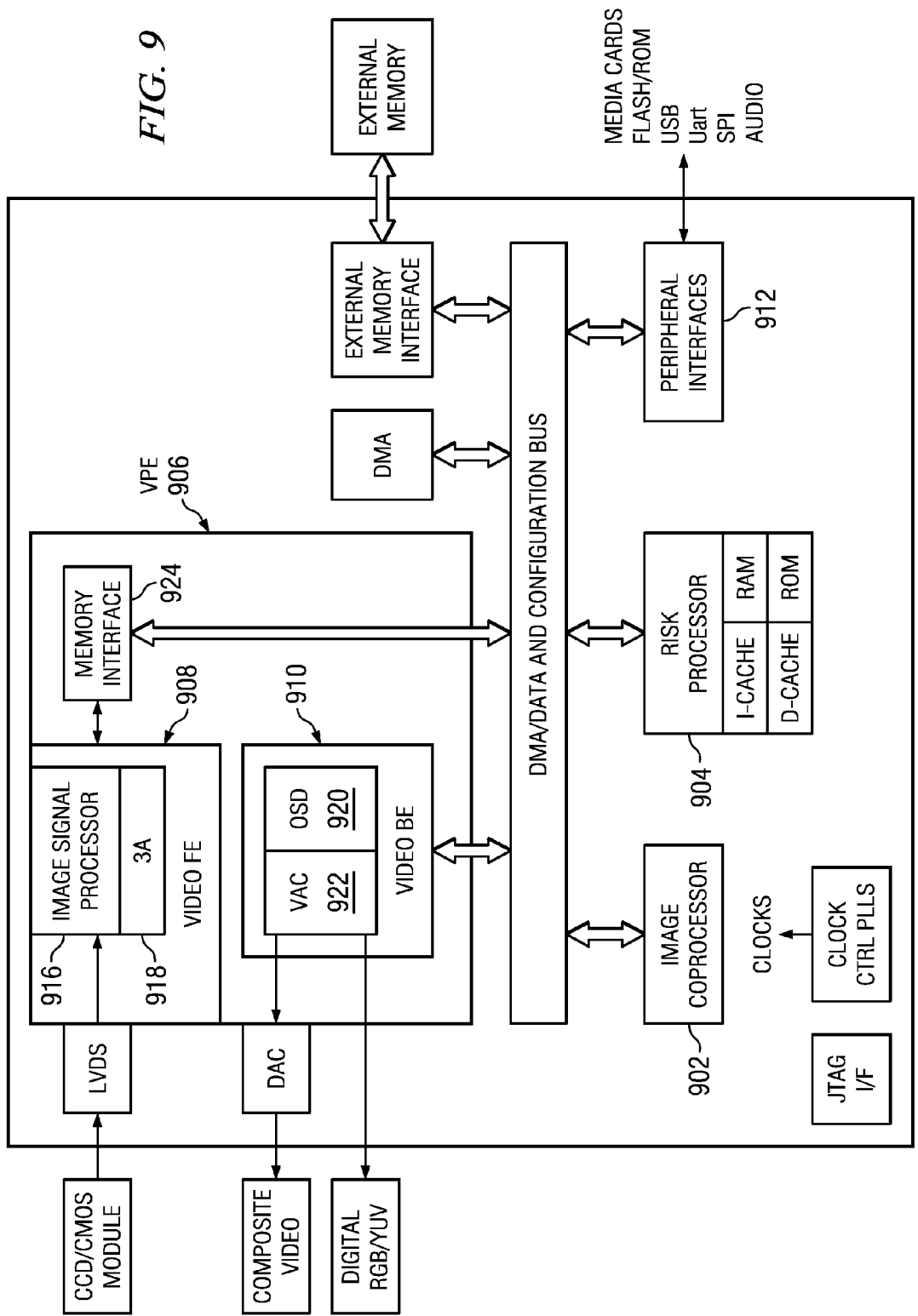
FIGS. 9-11 show illustrative digital systems in accordance with one or more embodiments of the invention.
Figure 10:
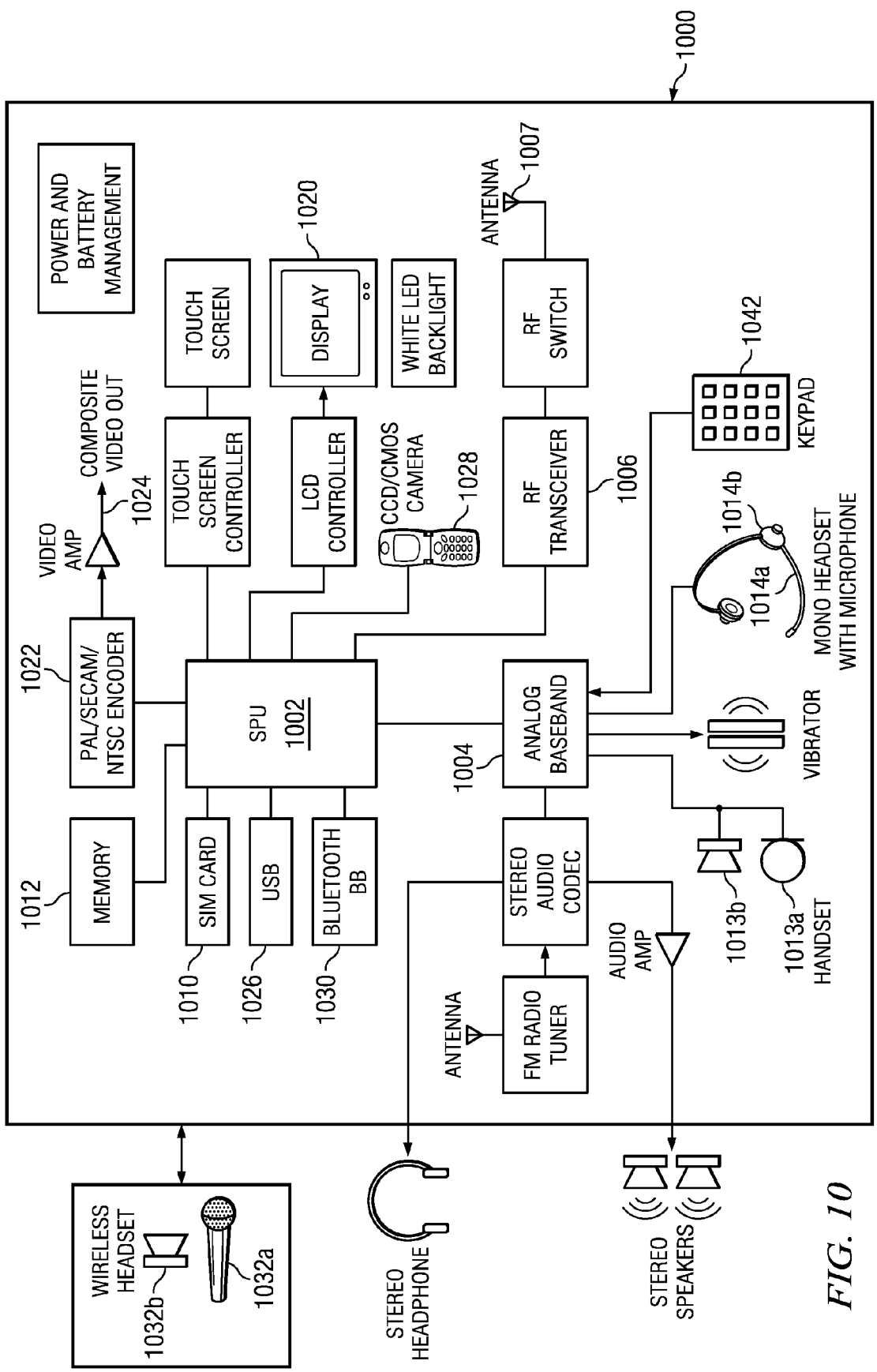
Figure 11:
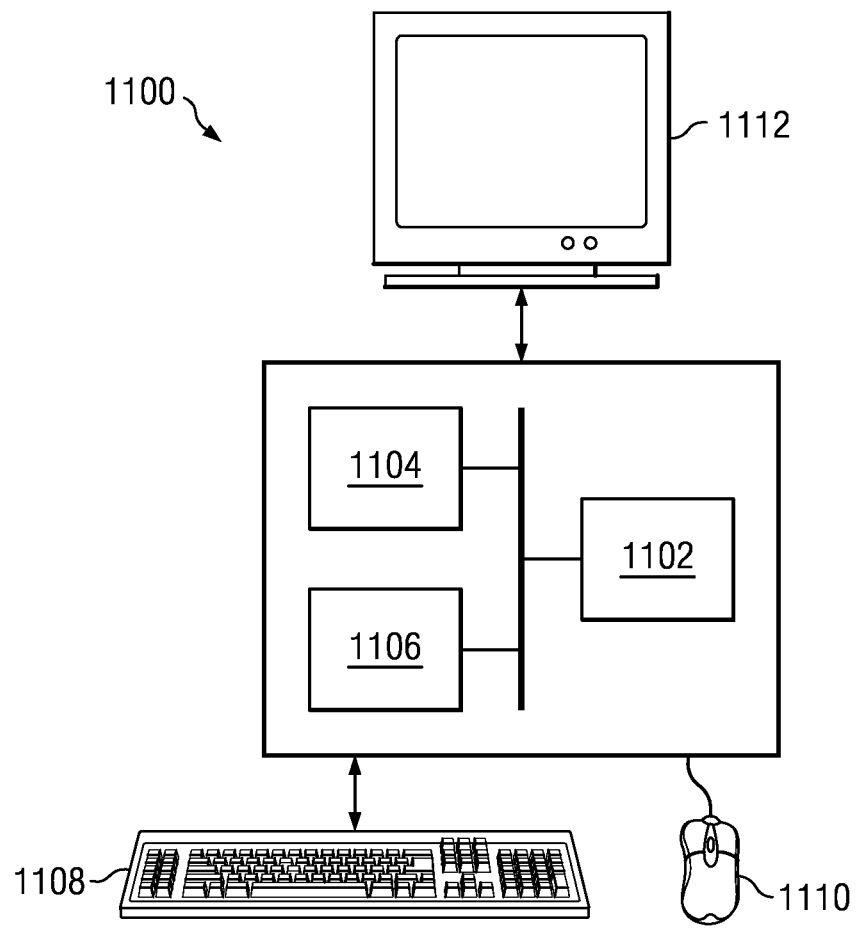

Embodiments of the methods and systems for digital image compression and decompression as described herein may be implemented for virtually any type of digital system (e.g., a desk top computer, a laptop computer, a handheld device such as a mobile (i.e., cellular) phone or MP3 player, a personal digital assistant, a digital video camera, a set top box, a digital video recorder (DVR), etc. with functionality to capture or otherwise generate digital image data and/or to receive and display digital image data. FIGS. 9-11 show block diagrams of illustrative digital systems.

FIG. 9 shows a digital system suitable for an embedded system (e.g., a digital camera) in accordance with one or more embodiments of the invention that includes, among other components, a DSP-based image coprocessor (ICP) (902), a RISC processor (904), and a video processing engine (VPE) (906) that may be configured to perform methods for digital image data compression and decompression described herein. The RISC processor (904) may be any suitably configured RISC processor. The VPE (906) includes a configurable video processing front-end (Video FE) (908) input interface used for video capture from imaging peripherals such as image sensors, video decoders, etc., a configurable video processing back-end (Video BE) (910) output interface used for display devices such as SDTV displays, digital LCD panels, HDTV video encoders, etc, and memory interface (924) shared by the Video FE (908) and the Video BE (910). The digital system also includes peripheral interfaces (912) for various peripherals that may include a multi-media card, an audio serial port, a Universal Serial Bus (USB) controller, a serial port interface, etc.

The Video FE (908) includes an image signal processor (ISP) (916), and a 3A statistic generator (3A) (918). The ISP (916) provides an interface to image sensors and digital video sources. More specifically, the ISP (916) may accept raw image/video data from a sensor (CMOS or CCD) and can accept YUV video data in numerous formats. The ISP (916) also includes a parameterized image processing module with functionality to generate image data in a color format (e.g., RGB) from raw CCD/CMOS data. The ISP (916) is customizable for each sensor type and supports video frame rates for preview displays of captured digital images and for video recording modes. The ISP (916) also includes, among other functionality, an image resizer, statistics collection functionality, and a boundary signal calculator. The 3A module (918) includes functionality to support control loops for auto focus, auto white balance, and auto exposure by collecting metrics on the raw image data from the ISP (916) or external memory.

The Video BE (910) includes an on-screen display engine (OSD) (920) and a video analog encoder (VAC) (922). The OSD engine (920) includes functionality to manage display data in various formats for several different types of hardware display windows and it also handles gathering and blending of video data and display/bitmap data into a single display window before providing the data to the VAC (922) in YCbCr format. The VAC (922) includes functionality to take the display frame from the OSD engine (920) and format it into the desired output format and output signals required to interface to display devices. The VAC (922) may interface to composite NTSC/PAL video devices, S-Video devices, digital LCD devices, high-definition video encoders, DVI/HDMI devices, etc.

The memory interface (924) functions as the primary source and sink to modules in the Video FE (908) and the Video BE (910) that are requesting and/or transferring data to/from external memory. The memory interface (924) includes read and write buffers and arbitration logic. In one or more embodiments of the invention, the Video FE (908) and the Video BE (910) are configured to perform compression of digital image data prior to transferring the data to external memory as described herein and to perform decompression of digital image data when transferring the data from external memory as described herein.

The ICP (902) includes functionality to perform the computational operations required for video encoding other processing of captured images. The video encoding standards supported may include one or more of the JPEG standards, the MPEG standards, and the H.26x standards. In one or more embodiments of the invention, the ICP (902) is configured to perform the computational operations of an embodiment of the compression and decompression methods described herein.

In operation, to capture an image or video sequence, video signals are received by the Video FE (908) and converted to the input format needed to perform video encoding. The video data generated by the Video FE (908) is stored in then stored in external memory. Prior to storing the video data in external memory, the video data is compressed as described herein. The video data is then encoded by a video encoder. During the encoding process, the video encoder reads the compressed input video data from the external memory and the computations for encoding this video data are performed by the ICP (902). The reference frames generated during video encoding are compressed as described herein and stored in the external memory. As the compressed reference frame data is read from the external memory, the reference frame data is decompressed as described herein. The encoded video data is stored in the external memory as it is generated. The encoded video data may then be read from the external memory, decoded, and post-processed by the Video BE (910) to display the image/video sequence.

FIG. 10 is a block diagram of a digital system (e.g., a mobile cellular telephone) (1000) that may be configured to perform compression and decompression as described herein. The signal processing unit (SPU) (1002) includes a digital processing processor system (DSP) that includes embedded memory and security features. The analog baseband unit (1004) receives a voice data stream from handset microphone (1013*a*) and sends a voice data stream to the handset mono speaker (1013*b*). The analog baseband unit (1004) also receives a voice data stream from the microphone (1014*a*) and sends a voice data stream to the mono headset (1014*b*). The analog baseband unit (1004) and the SPU (1002) may be separate ICs. In many embodiments, the analog baseband unit (1004) does not embed a programmable processor core, but performs processing based on configuration of audio paths, filters, gains, etc being setup by software running on the SPU (1002). In some embodiments, the analog baseband processing is performed on the same processor and can send information to it for interaction with a user of the digital system (1000) during a call processing or other processing.

The display (1020) may also display pictures and encoded video streams received from the network, from a local camera (1028), or from other sources such as the USB (1026) or the memory (1012). The SPU (1002) may also send a video stream to the display (1020) that is received from various sources such as the cellular network via the RF transceiver (1006) or the camera (1028). The SPU (1002) may also send a video stream to an external video display unit via the encoder (1022) over a composite output terminal (1024). The encoder unit (1022) may provide encoding according to PAL/SECAM/NTSC video standards.

The SPU (1002) includes functionality to perform the computational operations required for video encoding and decoding. The video encoding standards supported may include, for example, one or more of the JPEG standards, the MPEG standards, the H.26x standards, and the emerging HEVC standard. In one or more embodiments of the invention, the SPU (1002) is configured to perform the computational operations of compression and decompression of digital image data as described herein. Software instructions implementing all or part of the compression and decompression may be stored in the memory (1012) and executed by the SPU (1002) as part of capturing and/or encoding of digital image data, e.g., pictures and video streams and/or as part of decoding of digital image data for display.

FIG. 11 shows a digital system (1100) (e.g., a personal computer) that includes a processor (1102), associated memory (1104), a storage device (1106), and numerous other elements and functionalities typical of digital systems (not shown). In one or more embodiments of the invention, a digital system may include multiple processors and/or one or more of the processors may be digital signal processors. The digital system (1100) may also include input means, such as a keyboard (1108) and a mouse (1110) (or other cursor control device), and output means, such as a monitor (1112) (or other display device). Those skilled in the art will appreciate that the input and output means may take other forms. The digital system (1100) may also include an image capture device (not shown) that includes circuitry (e.g., optics, a sensor, readout electronics) for capturing video sequences. The digital system (1100) may include a video encoder with functionality to perform compression and decompression of digital image data as described herein.

The digital system (1100) may be connected to a network (not shown) (e.g., a local area network (LAN), a wide area network (WAN) such as the Internet, a cellular network, any other similar type of network and/or any combination thereof) via a network interface connection (not shown). The digital system (1500) may include functionality to receive encoded video sequences via the network interface connection, from the storage device (1506), and/or from removable storage media. The digital system (1500) may include a video decoder for decoding the encoded video sequences for display, the video decoder including functionality to perform compression and decompression of digital image data as described herein.

Further, those skilled in the art will appreciate that one or more elements of the aforementioned digital system (1100) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform computation operations of compression and decompression as described herein may be stored on a computer readable medium such as a compact disc (CD), a diskette, a tape, a file, memory, or any other computer readable storage device. The software instructions may be distributed to the digital system (1100) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, in some embodiments, spatial prediction may not be used. Instead, a residual value for each pixel (except the ULCP) in a block may be computed as the pixel value minus the minimum pixel value in the block. To encode the residual block, the minimum pixel value is coded as well as the residual pixel values. The minimum pixel value may be encoded using n-bit FLC and the residual pixel values may be encoded using FLC according to the compression level. In another example, the compression and decompression may operate in lossless or lossy mode. The lossless mode is as described herein. In lossy mode, the residual pixel values may be quantized before encoding and dequantized after decoding. In such embodiments, the neighboring pixels used in spatial prediction will be reconstructed pixels instead of original pixels. Further, the compression described herein is independent from block to block to enable random access. If random access is not needed, the spatial prediction may reference pixels to neighboring image data blocks to improve compression efficiency.

Accordingly, the scope of the invention should be limited only by the attached claims. It is therefore contemplated that the appended claims will cover any such modifications of the embodiments as fall within the true scope and spirit of the invention.

What is claimed is:

1. A method of compressing an image data block, the method comprising:
    computing a pixel residual for each pixel in the image data block except a non-residual pixel;
    computing a compression level for the image data block based on a minimum pixel residual value and a maximum pixel residual value of the pixel residuals;
    encoding a compression flag for the image data block, wherein the compression flag includes an indicator identifying the compression level and a first portion of bits from the non-residual pixel; and
    generating a compressed block comprising a second portion of bits from the non-residual pixel and the pixel residuals encoded using fixed length coding based on the compression level.

2. The method of claim 1, wherein the compression level specifies a number of bits in a codeword of the fixed length coding.

3. The method of claim 2, wherein the compression level is one of n compression levels, wherein n is a number of bits in a pixel and each of the n compression levels specifies a different number of bits.

4. The method of claim 3, wherein the compression level is one of a subset of compression levels selected from the n compression levels.

5. The method of claim 3, wherein the first portion of bits includes a same number of bits as specified by the compression level and the second portion of bits includes remaining bits in the non-residual pixel.

6. The method of claim 1, wherein computing a pixel residual further comprises spatially predicting each pixel except the non-residual pixel based on at least one neighboring pixel in the image data block.

7. The method of claim 6, wherein computing a pixel residual further comprises spatially predicting a pixel based on a top neighboring pixel, a top left neighboring pixel, and a left neighboring pixel.

8. The method of claim 1, wherein computing a pixel residual further comprises computing a pixel residual for a pixel as a difference between a value of the pixel and a minimum pixel value in the image data block.

9. The method of claim 2, further comprising:
    storing the compressed block in a compressed data buffer in external memory; and
    storing the compression flag in a compression flag buffer.

10. The method of claim 9, further comprising storing the image data block in the compressed data buffer when the compression level specifies a number of bits equal to a number of bits in a pixel.

11. A digital system comprising:
    means for computing a pixel residual for each pixel in an image data block except a non-residual pixel;
    means for computing a compression level for the image data block based on a minimum pixel residual value and a maximum pixel residual value of the pixel residuals;
    means for encoding a compression flag for the image data block, wherein the compression flag includes an indicator identifying the compression level and a first portion of bits from the non-residual pixel;
    means for encoding the pixel residuals using fixed length coding based on the compression level; and
    means for generating a compressed block comprising a second portion of bits from the non-residual pixel and the pixel residuals encoded using fixed length coding based on the compression level.

12. The digital system of claim 11, wherein the compression level specifies a number of bits in a codeword of the fixed length coding.

13. The digital system of claim 12, wherein the compression level is one of n compression levels, wherein n is a number of bits in a pixel and each of the n compression levels specifies a different number of bits.

14. The digital system of claim 13, wherein the compression level is one of a subset of compression levels selected from the n compression levels.

15. The digital system of claim 12, wherein the first portion of bits includes a same number of bits as specified by the compression level and the second portion of bits includes remaining bits in the non-residual pixel.

16. The digital system of claim 11, wherein the means for computing a pixel residual further comprises means for spatially predicting each pixel except the non-residual pixel based on at least one neighboring pixel in the image data block.

17. The digital system of claim 16, wherein the means for spatially predicting predicts a pixel based on a top neighboring pixel, a top left neighboring pixel, and a left neighboring pixel.

18. The digital system of claim 11, wherein the means for computing a pixel residual further comprises means for computing a pixel residual for each pixel as a difference between a value of the pixel and a minimum pixel value in the image data block.

19. The digital system of claim 12, further comprising:
    means for storing the compressed block in a compressed data buffer in external memory; and means for storing the compression flag in a compression flag buffer.

20. The digital system of claim 19, further comprising means for storing the image data block in the compressed data buffer when the compression level specifies a number of bits equal to a number of bits in a pixel.

* * * * *